United States Patent
Marappan et al.

(10) Patent No.: US 11,050,825 B1
(45) Date of Patent: Jun. 29, 2021

(54) STORAGE SYSTEM PORT USAGE INFORMATION SHARING BETWEEN HOST DEVICES

(71) Applicant: EMC IP Holding Company LLC, Hopkinton, MA (US)

(72) Inventors: Gopinath Marappan, Coimbatore (IN); Sanjib Mallick, Bangalore (IN); Maneesh Pusalkar, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/777,064

(22) Filed: Jan. 30, 2020

(51) Int. Cl.
| | |
|---|---|
| *H04L 29/08* | (2006.01) |
| *G06F 3/06* | (2006.01) |
| *H04L 12/851* | (2013.01) |
| *H04W 28/16* | (2009.01) |
| *H04L 5/00* | (2006.01) |
| *H04L 29/06* | (2006.01) |

(52) U.S. Cl.
CPC ........ *H04L 67/1097* (2013.01); *G06F 3/0604* (2013.01); *G06F 3/067* (2013.01); *G06F 3/0653* (2013.01); *H04L 5/0064* (2013.01); *H04L 47/24* (2013.01); *H04L 65/00* (2013.01); *H04L 65/80* (2013.01); *H04W 28/16* (2013.01)

(58) Field of Classification Search
CPC ... H04L 67/1097; H04L 65/00; H04L 5/0064; H04L 65/80; H04L 47/24; H04W 28/16; G06F 3/0653; G06F 3/0604; G06F 3/067
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Michael A Keller
(74) *Attorney, Agent, or Firm* — Ryan, Mason & Lewis, LLP (57) ABSTRACT

An apparatus comprises a first host device that is configured to communicate over a network with a storage system. The first host device is configured to obtain information on a bandwidth usage by a second host device of one or more ports of the storage system and to determine a bandwidth limit of the one or more ports of the storage system. The first host device is further configured to submit data to the one or more ports at a given bandwidth that is determined based at least in part on the obtained information and the determined bandwidth limit of the one or more ports of the storage system.

20 Claims, 6 Drawing Sheets

(56) References Cited

U.S. PATENT DOCUMENTS

| | | |
|---|---|---|
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,843,789 B2 | 9/2014 | Sandstrom et al. |
| 8,874,746 B1 | 10/2014 | Gonzalez |
| 8,919,537 B2 | 12/2014 | Sandstrom et al. |
| 9,026,694 B1 | 5/2015 | Davidson et al. |
| 9,268,501 B1 * | 2/2016 | Isakovich ............ G06F 3/0605 |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,467,102 B1 * | 11/2019 | Baruch ............. G06F 11/2094 |
| 10,474,367 B1 | 11/2019 | Mallick et al. |
| 10,476,960 B1 | 11/2019 | Rao et al. |
| 10,521,639 B2 | 12/2019 | Mallick et al. |
| 10,891,140 B1 * | 1/2021 | Levin .................. G06F 9/44505 |
| 2002/0023151 A1 | 2/2002 | Iwatani |
| 2002/0103923 A1 | 8/2002 | Cherian et al. |
| 2003/0069972 A1 * | 4/2003 | Yoshimura .......... H04L 67/1008 709/226 |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0086270 A1 * | 4/2013 | Nishikawa ............ G06F 9/5011 709/226 |
| 2013/0117766 A1 | 5/2013 | Bax et al. |
| 2014/0105068 A1 | 4/2014 | Xu |
| 2014/0126371 A1 * | 5/2014 | Choi ....................... H04L 47/24 370/235 |
| 2015/0074299 A1 * | 3/2015 | Maniwa ................ G06F 3/0608 710/74 |
| 2015/0222705 A1 | 8/2015 | Stephens |
| 2015/0242134 A1 | 8/2015 | Takada et al. |
| 2015/0312126 A1 * | 10/2015 | Deshpande ......... H04L 43/0894 709/216 |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0031610 A1 * | 2/2017 | Regester ............. G06F 3/0689 |
| 2017/0093744 A1 * | 3/2017 | Crosby ............. H04Q 11/0066 |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0180826 A1 * | 6/2019 | Benisty ..................... G06F 1/28 |
| 2020/0021492 A1 * | 1/2020 | Ganguli .............. H04L 67/1097 |
| 2020/0059376 A1 * | 2/2020 | Slovetskiy .......... H04L 12/1877 |
| 2020/0404573 A1 * | 12/2020 | Athlur ................. H04W 12/033 |

FOREIGN PATENT DOCUMENTS

| | | | |
|---|---|---|---|
| EP | 2667569 A1 * | 11/2013 | ............. H04L 41/12 |
| EP | 2667569 A1 | 11/2013 | |
| WO | WO-2017023271 A1 * | 2/2017 | ............. H04L 29/08 |
| WO | PCT/US2019/052549 | 12/2019 | |
| WO | PCT/US2019/053204 | 12/2019 | |
| WO | PCT/US2019/053473 | 12/2019 | |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

U.S. Appl. No. 15/795,653 filed in the name of Maneesh Pusalkar et al. filed Oct. 27, 2017, and entitled "Storage System with Network-Wide Configurable Device Names."

U.S. Appl. No. 16/142,274 filed in the name of Sanjib Mallick et al. filed Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. filed Sep. 28, 2018, and entitled "Host Device with Multi-Path Layer Implementing Path Selection Based at Least in Part on Fabric Identifiers."

U.S. Appl. No. 16/155,491 filed in the name of Kundan Kumar et al. filed Oct. 9, 2018, and entitled "Migrating Control of a Multi-Path Logical Device from a Current MPIO Driver to a Target MPIO Driver."

U.S. Appl. No. 16/155,429 filed in the name of Rimpesh Patel et al. filed Oct. 9, 2018, and entitled "Categorizing Host IO Load Pattern and Communicating Categorization to Storage System."

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

U.S. Appl. No. 16/593,001 filed in the name of Gopinath Marappan filed Oct. 4, 2019, and entitled "Path Failure Information Sharing Between Host Devices Connected to a Storage System."

U.S. Appl. No. 16/734,526 filed in the name of Gopinath Marappan et al. filed Jan. 6, 2020, and entitled "Multipath Device Pseudo Name to Logical Volume Mapping for Host Devices."

* cited by examiner

```
Pseudo name=mpathdevice
Storage Array ID=0123456789910
Logical device ID=87654321
Device WWN=12345678912345678912345
state=alive; policy=SymmOpt; queued-IOs=0
==============================================================================
--------- Host ---------- - Stor - -- I/O Path -- -- Stats --
HW Path I/O Paths Interf. Mode State Q-IOs Errors
==============================================================================
3 qla2xxx sdgs FA 1d:05 active alive 0 0
0 qla2xxx sdhf FA 1d:05 active alive 0 0
3 qla2xxx sdia FA 2d:05 active alive 0 0
0 qla2xxx sdka FA 2d:05 active alive 0 0
```

```
[root@abc123456 ~]# mt display perf dev=a
Timestamp = 12:13:34 UTC, 1 Jan 2020
Sample Interval = 60
Pseudo name=mpathdevice
Storage Array ID=0123456789l0
Logical device ID=87654321
Device WWN=12345678912345678912345678912345
state=alive; policy=SymmOpt; queued-IOs=2

KB<=4   4<KB<=8   8<KB<=128   KB>128   All
Read bytes/s  - -   - -   32.8M   -   32.8M
Write bytes/s  - -   - -   - -   -   -
Total bytes/s 32.8M Read Avg Response ms  - -   7.21   -   7.21
Write Avg Response ms  - -   - -   -   -
All Avg Response ms 7.21
```

```
=====================================================
-------- Host -------- -------- Metrics -------- Retry Error
HW Path I/O Paths Reads---Writes delta delta
=====================================================

0 qla2xxx sdmw
Low Latency (ms) 0.442 - 0 0
High Latency (ms) 170 –

0 qla2xxx sdnt
Low Latency (ms) 0.450 - 0 0
High Latency (ms) 177 –

3 qla2xxx sddz
Low Latency (ms) 0.453 - 0 0
High Latency (ms) 143 –

3 qla2xxx sdhh
Low Latency (ms) 0.442 - 0 0
High Latency (ms) 176 -
```

STORAGE SYSTEM PORT USAGE INFORMATION SHARING BETWEEN HOST DEVICES

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the given host device to the storage system. The IO operations are delivered along a plurality of paths to ports of the storage system. In some cases, where multiple MPIO drivers submit IO operations to the same ports, the ports may become congested when the incoming bandwidth usage of the IO operations from the host devices is greater than the maximum capacity of the ports.

SUMMARY

In one embodiment, an apparatus comprises a first host device that is configured to communicate over a network with a storage system. The first host device is configured to obtain information on a bandwidth usage by a second host device of one or more ports of the storage system and to determine a bandwidth limit of the one or more ports of the storage system. The first host device is further configured to submit data to the one or more ports at a given bandwidth that is determined based at least in part on the obtained information and the determined bandwidth limit of the one or more ports of the storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
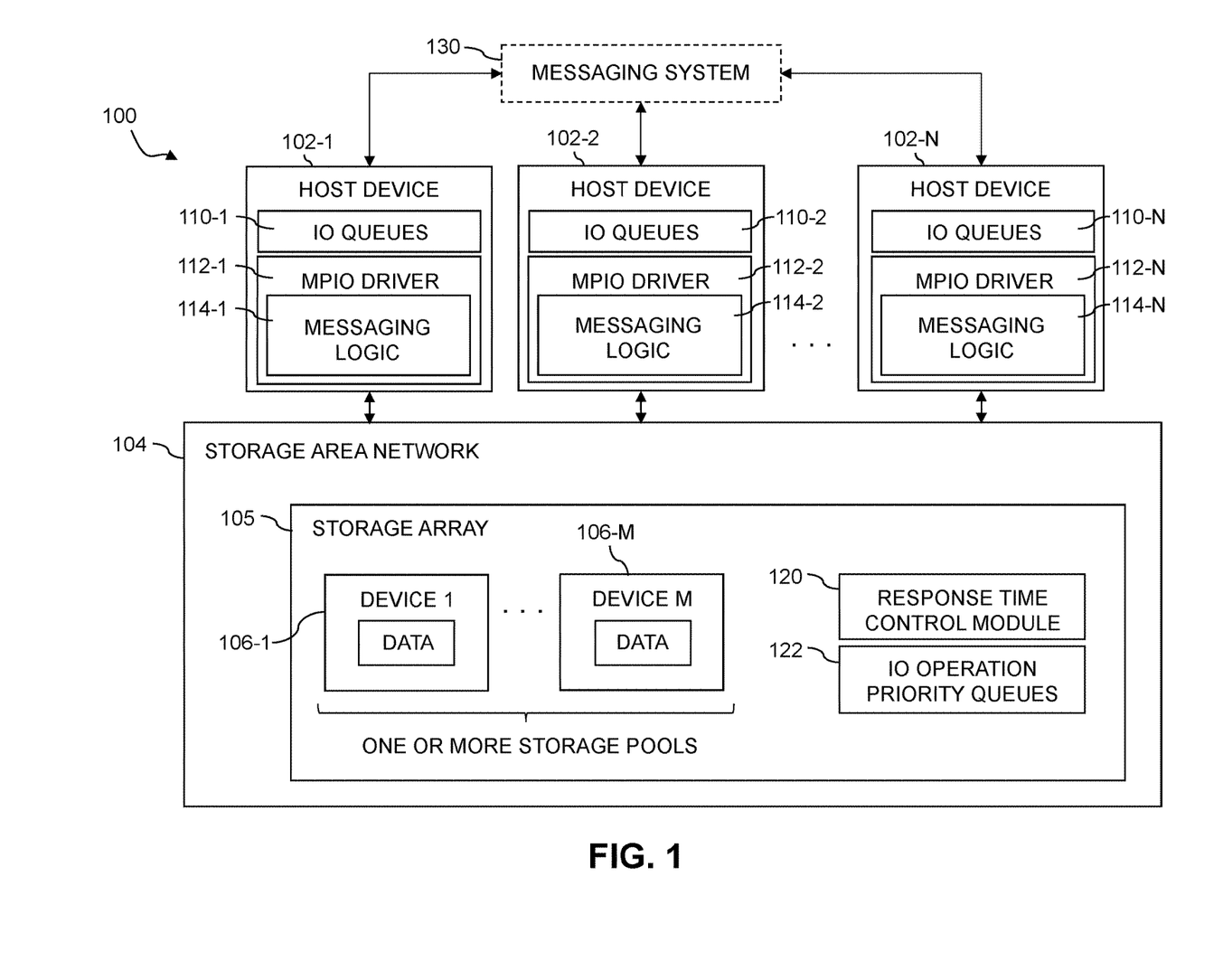
FIG. 1 is a block diagram of an information processing system configured with functionality for port usage information sharing between host devices in an illustrative embodiment.

FIG. 1 shows an information processing system 100 configured in accordance with an illustrative embodiment. The information processing system 100 comprises a plurality of host devices 102-1, 102-2, . . . 102-N, referred to herein collectively as host devices 102. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

In some embodiments, the host devices 102 may also communicate with a messaging system 130 either over the SAN 104 or over one or more other network connections. Messaging system 130 is utilized by the host devices 102 to convey information between the host devices 102. In illustrative embodiments, messaging system 130 may comprise a subscription-based messaging system such as, e.g., a Message Queuing Telemetry Transport (MQTT) messaging system or any other subscription-based messaging system. In other embodiments any form of messaging system that may be utilized to convey information between the host devices 102 may be used. In some embodiments, the host devices 102 may alternatively communicate directly with each other without using an intermediary messaging system 130. An example implementation of a messaging system is disclosed in U.S. patent application Ser. No. 16/593,001, filed Oct. 4, 2019, and entitled "Path Failure Information Sharing Between Host Devices Connected to a Storage System," the entirety of which is incorporated by reference herein.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for messaging logic 114-1, 114-2, . . . 114-N implemented within the MPIO drivers 112. In some embodiments the messaging logic 114 may alternatively be implemented within the respective host devices 102 separate from the MPIO drivers 112 and may be utilized by the MPIO drivers 112 to communicate with each other, e.g., via messaging system 130.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device. In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC, suitably modified in the manner disclosed herein to implement functionality for port usage information sharing between host devices. Other types of MPIO drivers from other driver vendors may be suitably modified to incorporate functionality for port usage information sharing between host devices as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019, the entirety of which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and messaging logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In an environment having multiple host devices connected to a storage array, such as, e.g., the system a given host device's multipathing software, e.g., an MPIO driver, is typically independent of the multipathing software of the other host devices. For example, the multipathing software of the given host device typically does not share information with the multipathing software of the other host devices that utilize the storage array, but instead determines the path conditions for routing IO operations to the storage array by itself without considering any information from the other host devices.

In a host device running multipath software, the multipath layer typically sits above the SCSI and HBA layers. When the multipath layer dispatches an IO operation, it first goes to the SCSI layer, then the HBA Layer and then conveyed down the communication link to a port of the storage array.

Figure 2:
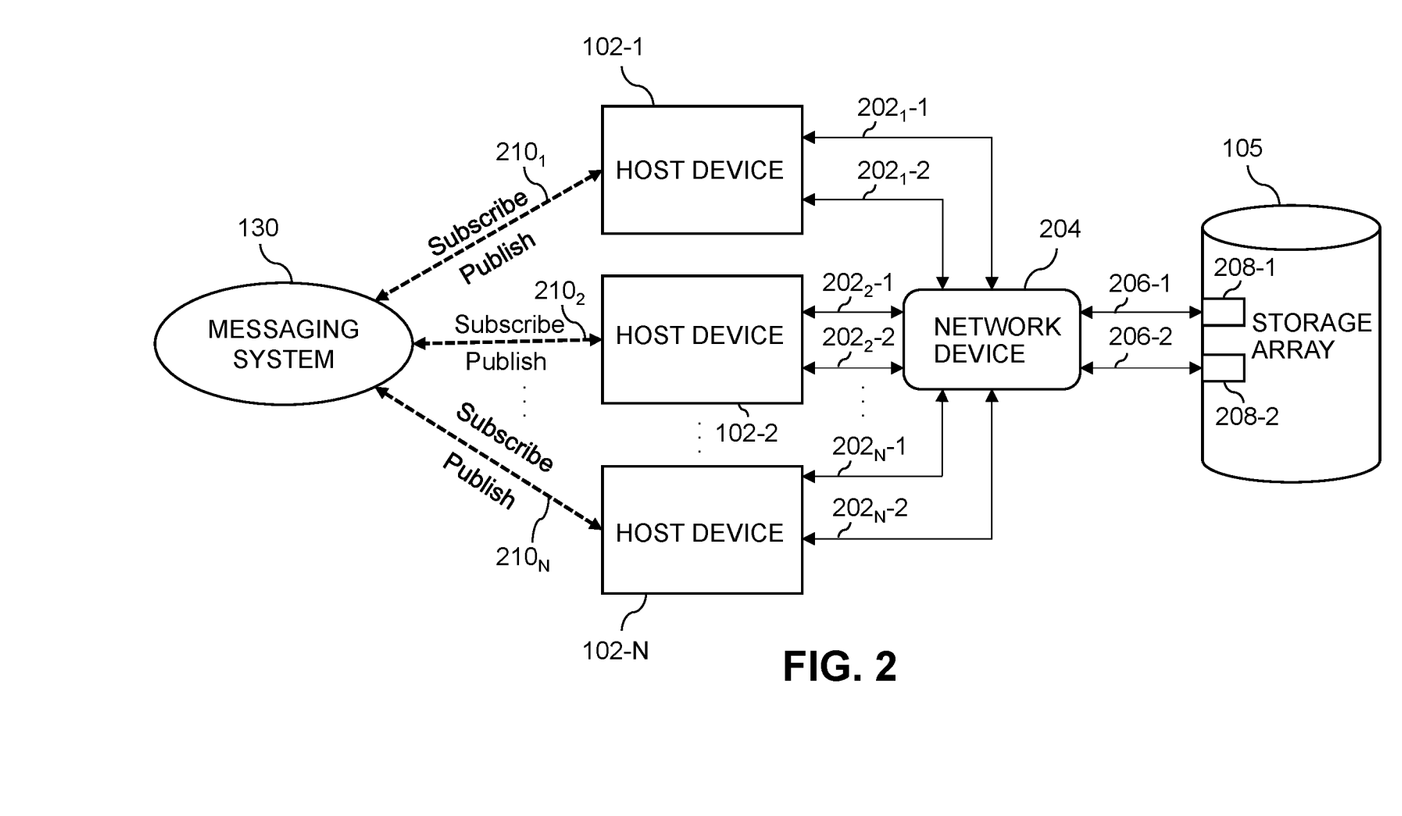
FIG. 2 is a block diagram illustrating an example implementation of the information processing system of FIG. 1 in an illustrative embodiment.

With reference now to FIG. 2, an example configuration of system 100 is illustrated. In FIG. 2, each of the host devices 102 communicates with the storage array 105 via a plurality of paths which utilize a combination of communication links 202, one or more network devices 204, e.g., a switch, communication links 206, and ports 208. While the example of FIG. 2 only illustrates a single switch, two ports, and a number of communication links, any other number of each of these components may also be present in the storage system and utilized to provide communications between the host devices 102 and the storage array 105.

In the illustrated example, host device 102-1 is connected to the network device 204 using communication links 2021-1 and 2021-2, host device 102-2 is connected to the network device 204 using communication links 2022-1 and 2022-2, and host device 102-N is connected to the network device 204 using communication links 202N-1 and 202N-2. Network device 204 is connected to port 208-1 of the storage array 105 using communication link 206-1 and is connected to port 208-2 of the storage array 105 using communication link 206-2. A given path between a host device and the storage array 105 utilizes one of the communication links 202, the network device 204, one of the communication links 206 and one of the corresponding connected ports 208. Although not illustrated in FIG. 2, each host device may also comprise an HBA connected to at least one of the communication links 202 which may be described as an initiator of a path. Each port 208 may likewise be described as a target of a path.

As an example, a first path between host device 102-1 and storage array 105 in the example of FIG. 2 may comprise communication link 2021-1, network device 204, communication link 206-1 and port 208-1. A second path between host device 102-1 and storage array 105 in the example of FIG. 2 may comprise communication link 2021-1, network device 204, communication link 206-2 and port 208-2. A third path between host device 102-1 and storage array 105 in the example of FIG. 2 may comprise communication link 2021-2, network device 204, communication link 206-1 and port 208-1. A fourth path between host device 102-1 and storage array 105 in the example of FIG. 2 may comprise communication link 2021-2, network device 204, communication link 206-2 and port 208-2. In this example, there are four available paths between host device 102-1 and storage array 105. Host devices 102-2, . . . 102-N may have available paths described in a similar manner. In other examples embodiments, where there are a smaller or larger numbers of communication links 202, network devices 204, communication links 206, or ports 208 between the host devices 102 and the storage array 105, a smaller or larger number of paths may alternatively be available.

As seen in FIG. 2, each of the host devices 102 may also communicate with messaging system 130. For example, as seen in FIG. 2, host device 102-1 may communicate with messaging system 130 using a communication link 2101, host device 102-2 may communicate with messaging system using a communication link 2102, and host device 102-N may communicate with the messaging system using a communication link 210N. Communication links 210 may be utilized by the host devices 102 to subscribe to the messaging system 130, to publish information to the messaging system 130, and to receive information from the messaging system 130 that was published by other host devices 102. In some embodiments, communication links 210 may be separate from SAN 104. In some embodiments, SAN 104 may comprise communication links 210.

The MPIO drivers 112 in the host devices 102 typically implement load balancing algorithms that take into account such factors as, e.g., IOs already dispatched, queue depth, or other similar factors, when determining which paths to select for submitting IO operations to the storage system. These load balancing algorithms attempt to maximize bandwidth usage of the ports 208 of the storage array 105 by utilizing as much available capacity on the ports of the storage array 105 as possible.

As mentioned above, an information processing system may comprise multiple host devices 102 that are connected to the same storage array 105. Each of these host devices 102 may host applications of different criticality. For instance, some host devices 102 may be running mission critical applications such as, e.g., online transactional processing (OLTP), while other host devices 102 may be running applications having a lower criticality. Typically, mission critical applications require a higher quality of service (QoS) than lower criticality applications.

Since the load balancing algorithms of the MPIO drivers 112 on different host devices 102 typically run in isolation from one another, maintaining a higher QoS for applications running on certain host devices 102 may become difficult as the MPIO drivers 112 of each host device 102 are independently trying to maximize the bandwidth usage for their own host devices 102. The competition for bandwidth usage between the host devices 102 may lead to congestion on the shared ports of the storage system.

In an example scenario, multiple host devices 102-1, 102-2, . . . 102-N are connected to the same set of ports, 208-1 and 208-2, on a storage array 105. In this example scenario, one or more of the host devices 102 are actively sending IO operations to the storage array 105 via one or more of the ports 208 at any particular time. For example, host device 102-1 and host device 102-2 may both be actively sending IO operations to the storage array 105 along paths which include ports 208-1 and 208-2 and each of the host devices 102-1 and 102-2 is running an application having a different QoS. While two host devices 102 are used in this example scenario for simplicity, any number of host devices 102 may be connected to the same storage system ports 208.

In this example scenario, host device 102-1 may have a QoS that requires a minimum available bandwidth of 19 gigabits per second (Gb/s) and host device 102-2 may have a QoS that requires a minimum available bandwidth of 1 Gb/s. While a given QoS defines a minimum available bandwidth, that minimum bandwidth need not be available at all times for that host device 102, just in cases where the host device 102 is actually submitting IO operations that will utilize that minimum available bandwidth. For example, if the host device 102-1 is only submitting 10 Gb/s of data to the ports 208, the ports 208 need not have the full 19 Gb/s available for use by the host device 102-1 to satisfy the QoS since the extra bandwidth is not needed at that time.

Continuing the example scenario, the two storage system ports 208-1 and 208-2 each have a maximum bandwidth capacity of 10 Gb/s for a combined maximum bandwidth capacity of 20 Gb/s. In some cases, the bandwidth of each port 208-1 and 208-2 may be a manually specified configuration parameter. Alternatively, the host devices 102 may determine the available bandwidth by, for example, sending a proprietary SCSI or other command to the storage system.

During a normal operating condition in the example scenario, host device 102-1 may not be sending its full QoS of data to the ports 208 of the storage system. For example, while the QoS designated for host device 102-1 has a minimum available bandwidth of 19 Gb/s in this example scenario, host device 102-1 may only be sending 10 Gb/s during the normal operating conditions. During the normal operating condition, host device 102-2 may also be sending 10 Gb/s of data to ports 208-1 and 208-2. In some cases, for example, host device 102-2 may try to send more data than the remaining available 10 Gb/s for the ports 208 which may cause congestion on the ports 208 and impact the QoS of host device 102-1.

During peak hours, host device 102-1 begins sending its full QoS minimum of 19 Gb/s of data to the ports 208 of the storage system. In such a case, because host device 102-2 does not know how much data host device 102-1 is sending to the ports 208, and does not know the QoS requirements of host device 102-1, host device 102-2 may continue attempting to maximize its bandwidth to the ports 208, for example, by continuing to send 10 Gb/s to the ports 208. This may also cause congestion on the ports 208 and impact the QoS of host device 102-1.

The disclosed messaging logic 114 is configured to allow the MPIO drivers 112 of the host devices 102 to share their current IO bandwidth usage and desired QoS with the MPIO drivers 112 of the other host devices 102 that are connected to the same storage array ports 208. In this manner, the MPIO drivers 112 of each host device 102 are made aware of the current IO bandwidth usage and QoS requirements of the other host devices 102. The messaging logic 114 of the host devices 102 that are running applications with a lower QoS may be configured to decrease their bandwidth usage intentionally when they become aware that host devices 102 running applications with higher QoS are not meeting the target bandwidth usage on the shared ports 208. This may occur because the ports 208 or storage array 105 have a finite total bandwidth that is shared by the host devices 102.

Messaging logic 114 uses co-operative multipathing concepts to share information across host devices 102 using a messaging protocol such as, e.g., MQ telemetry transport (MQTT). In one example, the storage system may comprise a messaging system 130 such as, e.g., a MQTT broker service, which has a plurality of topics to which host devices 102 may subscribe.

MQTT is a publish-subscribed-based messaging protocol that allows host devices 102 to subscribe to a topic and then receive messages from that topic when they are published to that topic by other host devices 102. A given host device 102 may share port usage information with other host devices 102 by publishing the port usage information on a topic as an MQTT message. For example, an MPIO driver 112-1 of the host device 102-1 may subscribe to topics relating to the ports 208 of the storage array 105 that the host device 102-1 is connected to and then receive MQTT messages from that topic that are published by other host devices 102 which also subscribed to that topic. For example, each array port 208 may have its own corresponding MQTT topic on the messaging system 130. While the techniques described herein utilize MQTT messaging protocols, any other messaging protocol may alternatively be used to facilitate communication between host devices including one-to-one communication protocols, one-to-many protocols, many-to-many communication protocols, other subscription-based communication protocols or any other communication protocols.

As shown in FIG. 2, in one example, hosts 102-1, 102-2 and 102-N are connected to the storage array 105 via a network device 204 using ports 208-1 and 208-2. Hosts 120-1, 102-2 and 102-N also subscribe to the topics on the messaging system 130, e.g., an MQTT broker, that correspond to those ports 208-1 and 208-2. Each topic is identified by combination of a storage array identifier (ID) and a port identifier. For example, the messaging system 130 may comprise a first topic/Storage array ID/Port1 and a second topic/Storage array ID/Port2.

Figure 3:
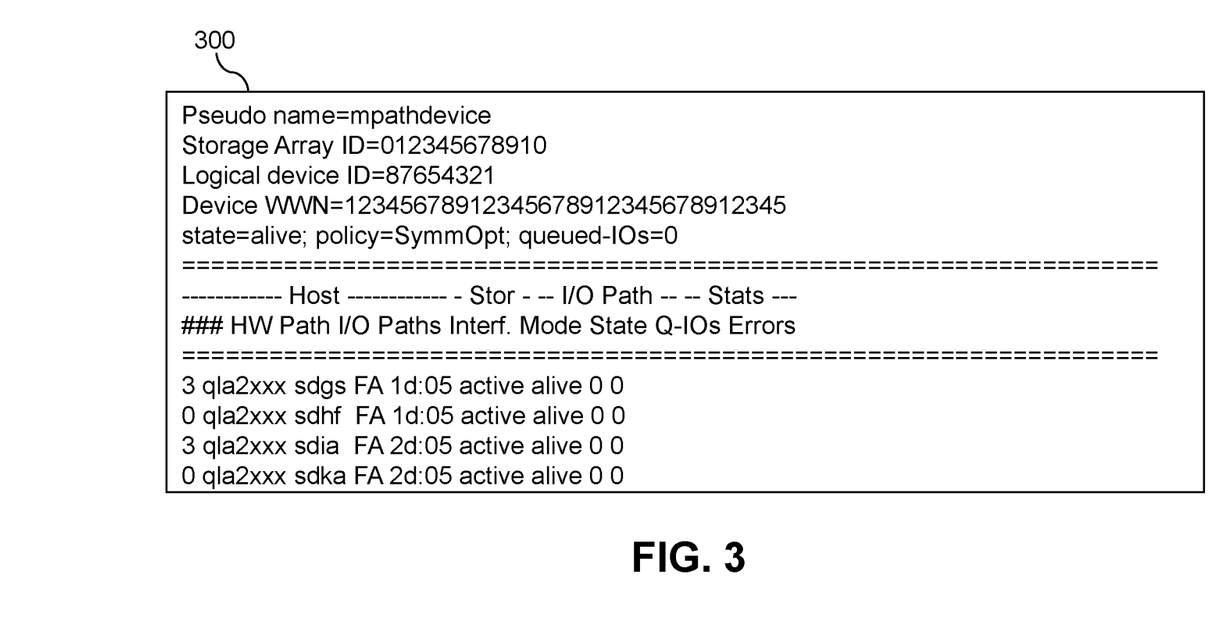
FIG. 3 is an illustration of an example multipath device of the information processing system of FIG. 1 in an illustrative embodiment.

An example multipath device 300 is described with reference to FIG. 3. As seen in FIG. 3, the multipath device 300 has a storage array ID of 012345678910 and has four listed paths, sdgs, sdhf, sdia, and sdka. Paths sdgs and sdhf utilize port 1d:05 while paths sdia and sdka utilize port 2d:05. Ports 1d:05 and 2d:05 may correspond to ports 208-1 and 208-2 in the above example scenario.

For the above example multipath device 300, the host devices 102-1 will subscribe to the following two topics on the messaging system:
Topic1: /012345678910/1d:05
Topic2: /012345678910/2d:05

For example, the topics may be identified based on the storage array ID of the storage array 105, e.g., 012345678910, and the ports 208 associated with the paths of the multipath device 300, e.g., ports 1d:05 and 2d:05.

Other host devices 102 that are connected to these ports 208 will also be subscribed to the same topics. When a host device 102 sends a message comprising port usage information about that host device's usage of a particular port to the corresponding topic for that port, e.g., by publishing an MQTT message comprising the port usage information to the topic, all other host devices 102 that are subscribed to that topic will receive a corresponding message comprising the port usage information from the messaging system 130.

In some cases, the MPIO driver 112 residing on a given host device 102, or another component of the host device 102 is configured to gather and calculate data for IO operations being submitted by that host device 102 to the storage system. This data may comprise, for example, the number of read IO operations, the number of write IO operations, the sizes of the read IO operations, the sizes of the write IO operations, which paths and ports the IO operations are being submitted on, the criticality or QoS level of the IO operations, the priority of the IO operations or any other information about the IO operations.

Figure 4:
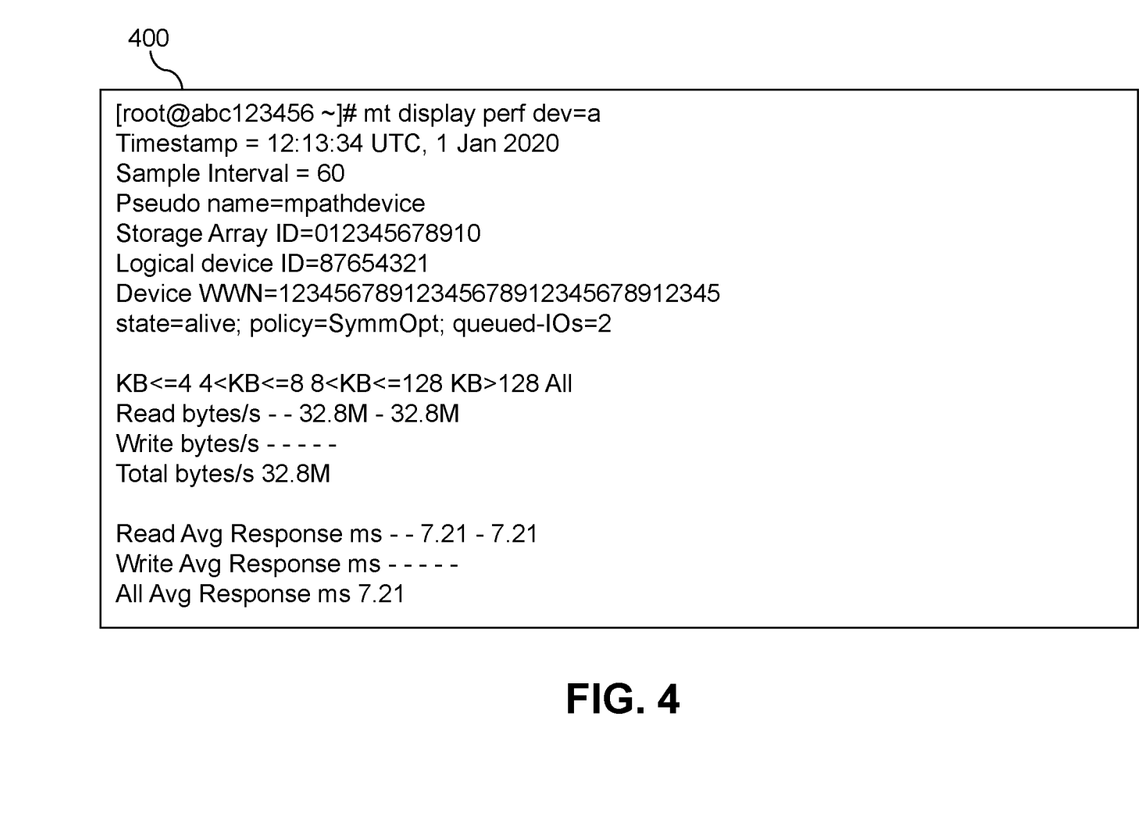
FIG. 4 is an illustration of example port usage data gathered by a host device of the information processing system of FIG. 1 in an illustrative embodiment.
Figure 5:
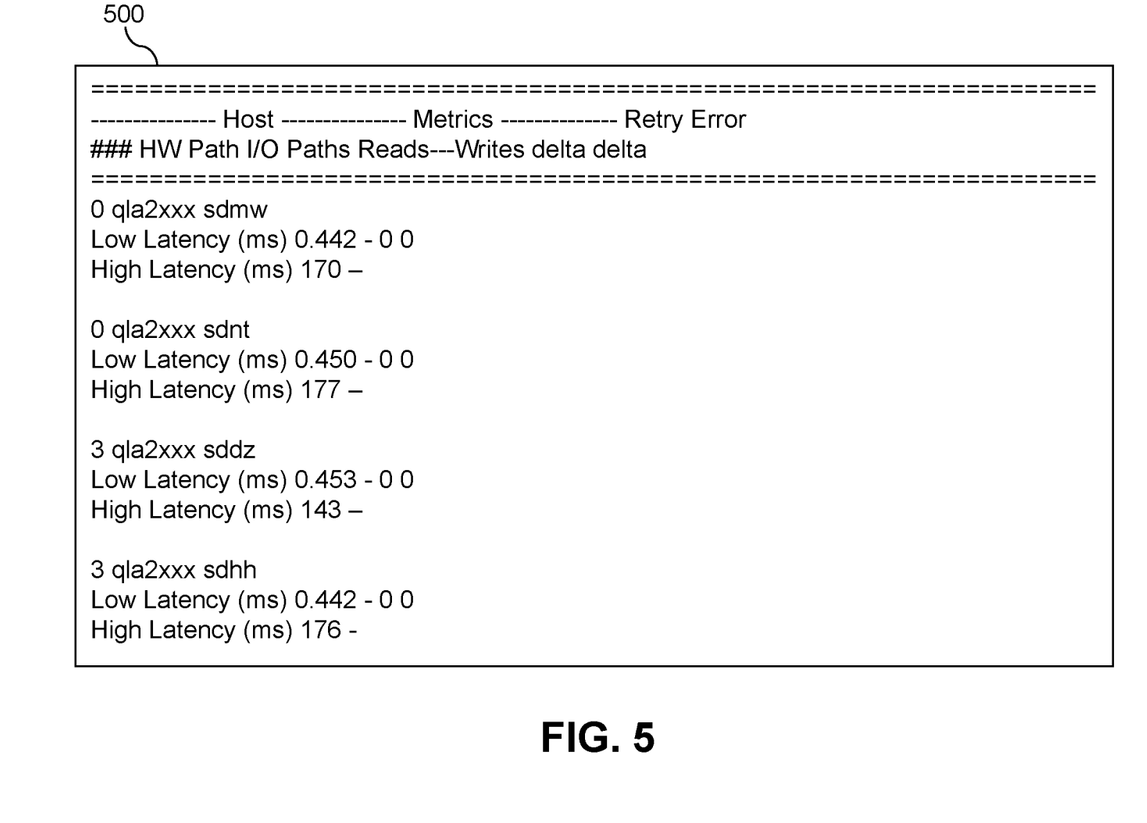
FIG. 5 is another illustration of example port usage data gathered by a host device of the information processing system of FIG. 1 in an illustrative embodiment.

With reference now to FIGS. 4 and 5, example data 400 and 500 that is gathered and calculated by an example host device 102 is illustrated.

For example, as seen in FIG. 4, example data 400 comprises an indication of the multipath device, storage array ID, logical device ID, device WWN, and various other states of the multipath device. In addition, example data 400 comprises a timestamp indicating the time at which the data was captured and may comprise an indication of a sample interval for how often the data is captured.

The example data 400 may comprise, for example, an indication of how many bytes of data are being read from a given port, how many bytes of data are being written to the given port, a total number of bytes that are read or written from or to the given port, an average response time for the reads, an average response time for the writes and a combined average response time.

With reference to FIG. 5, for example, example data 500 may comprise an indication of each path to a given port and a corresponding high latency and low latency for each path.

The information contained in data 400 and data 500 may be analyzed by the MPIO driver 112 and used to generate a message for sending to the topic of the messaging system 130 corresponding to a given port.

For example, the data or other information about the cumulative read and write IO operations being sent to a particular port can be gathered and calculated continuously, periodically, or in any other manner and messaging logic 114 may be configured to submit the gathered data and calculations as messages to the topics corresponding to their respective ports such as, e.g., topic/0000000000001/1d:05. All other host devices that have subscribed to the topic for that port will receive these messages.

The messaging logic 114 is configured to inhibit port congestion and maintain QoS across a variety of host devices 102 running applications having varying criticality. The process flow of the messaging logic 114 will be described according to the example scenario above but is not limited to the example scenario and any other process steps, order of process steps or combination of process steps may also or alternatively be utilized by messaging and balancing logic.

In an example scenario, similar to that described above, host device 102-1 comprises a QoS requiring a minimum available bandwidth of 19 Gb/s and host device 102-2 comprises a QoS requiring a minimum available bandwidth of 1 Gb/s. In this example scenario, the criticality of the QoS of host device 102-1 is higher than the criticality of the QoS of host device 102-2 such that IO operations submitted by host device 102-1 have priority over IO operations submitted by host device 102-2. In this example, as above, the ports 208-1 and 208-2 of the storage system each have a maximum capacity of 10 Gb/s for a total capacity of 20 Gb/s over both ports 208.

During a normal operating condition in this example scenario, host device 102-1 may not be sending its full QoS of data to the ports 208 of the storage system. For example, while the QoS designated for host device 102-1 has a minimum available bandwidth of 19 Gb/s in this example scenario, host device 102-1 may only be sending 10 Gb/s during the normal operating conditions. During the normal operating condition, host device 102-2 may wish to send 10 Gb/s of data to ports 208-1 and 208-2.

The messaging logic 114 running on host device 102-1 submits port usage information indicating the current bandwidth usage of host device 102-1, e.g., 10 Gb/s, along with the QoS details of host device 102-1, e.g., a minimum bandwidth of 19 Gb/s, to the messaging system 130 to the topics for the corresponding ports 208-1 and 208-2 of the storage system that are being used by host device 102-1. As an example, the messaging system 130 may comprise an MQTT broker service and the port usage information may be submitted as an MQTT message.

Host device 102-2, which is subscribed to the topic of the messaging system 130 for those ports, e.g., the MQTT topics, receives the message submitted by host device 102-1 from the messaging system 130. Since host device 102-1 is using only 10 Gb/s at the current time, host device 102-2 is able to send more than the minimum 1 Gb/s of data defined by its QoS to the ports 208 without affecting the QoS of host device 102-1. For example, since host device 102-1 is sending 10 Gb/s and the ports 208 have a combined max capacity of 20 Gb/s, 10 Gb/s may be available for use by host device 102-2 if needed. Host device 102-2 may then send up to 10 Gb/s of data to the ports 208 based on the port usage information obtained from the messaging system 130 for those ports 208 of the storage system. In this manner, messaging logic 114 inhibits congestion of the ports and allows excess capacity of the port to be utilized by a host device 102 having a lower QoS criticality when the host device 102 having a higher QoS criticality is not utilizing its full QoS capacity.

During peak hours, host device 102-1 may begin sending its full QoS minimum of 19 Gb/s of data to the ports 208 of the storage system. In such a case, the messaging logic 114 running on host device 102-1 submits port usage information indicating the current bandwidth usage of host device 102-1, e.g., 19 Gb/s, along with the QoS details of host device 102-1, e.g., a minimum bandwidth of 19 Gb/s, to the messaging system 130 to the topics for the corresponding ports 208-1 and 208-2 of the storage system that are being used by host device 102-1.

Host device 102-2, which is still subscribed to the topics of the messaging system 130 for these ports, receives the message submitted by host device 102-1 from the messaging system 130. Since host device 102-1 is using 19 Gb/s at the current time, only 1 Gb/s is now available for use by host device 102-2. Even though host device 102-2 may have more than 1 Gb/s of data to send to the ports 208 at the moment, the messaging logic 114 on host device 102-2 will throttle the bandwidth usage of host device 102-2 to just the available 1 Gb/s so that host device 102-2 does not affect the QoS of host device 102-1. The messaging logic 114 of host device 102-2 will also submit a message to the topics for those ports 208 with an indication of the current bandwidth usage of host device 102-2, e.g., 1 Gb/s, and the QoS details of host device 102-2, e.g., a minimum available bandwidth of 1 Gb/s. Host device 102-1, which is subscribed to the topics for the ports 208 will receive this information and know that only the 19 Gb/s of bandwidth corresponding to its minimum QoS is available for its use. Host device 102-1 will therefore not attempt to submit greater than the 19 Gb/s to the ports 208. Since the combined bandwidth usage from both host device 102-1 and host device 102-2 is equal to or less than the maximum Gb/s available from the two ports 208, e.g., 20 Gb/s, congestion in the ports is inhibited from occurring and the QoS of both host devices 102-1 and 102-2 is satisfied.

The messaging logic 114 may repeat the process as the required bandwidth for host device 102-1 changes such that host device 102-2 will take advantage of any spare bandwidth that is available on the ports 208 when host device 102-1 is utilizing less than the minimum capacity defined by its QoS, as indicated in the message to the messaging system submitted by host device 102-1 for those ports. Likewise, messaging logic 114 residing on host device 102-2 will automatically throttle the bandwidth usage of host device 102-2 when it receives a message from the messaging system 130 indicating that the bandwidth usage of host device 102-1 on those ports 208 has increased to its minimum QoS bandwidth. Similarly, host device 102-1 may utilize more than its minimum QoS bandwidth when host device 102-2 does not utilize its full minimum QoS bandwidth and may throttle itself when host device 102-2 increases its bandwidth usage to its minimum QoS bandwidth.

The use of the messaging logic 114 described in the example scenario above ensures that all of the host devices 102 that utilize a given port or set of ports 208 of the storage system will be guaranteed to meet their QoS while inhibiting potential congestion that may be caused by overuse of the ports 208 by the host devices 102. In addition, if any of the host devices 102 are utilizing less than their QoS at any given time such that additional spare bandwidth is available on those ports 208, the other host devices 102 may take advantage of that spare bandwidth by increasing their bandwidth usage above their minimum QoS to a level that utilizes the spare bandwidth based on the information contained in the messages from the messaging service 130 without exceeding the maximum capacity of the ports 208, which prevents port congestion. The use of the spare bandwidth may then be throttled back if the spare bandwidth becomes needed to satisfy the minimum QoS bandwidth of one or more of the host devices 102.

Illustrative embodiments of the techniques and functionality of messaging logic 114 will now be described in more detail with reference to the flow diagram of FIG. 6.

Figure 6:
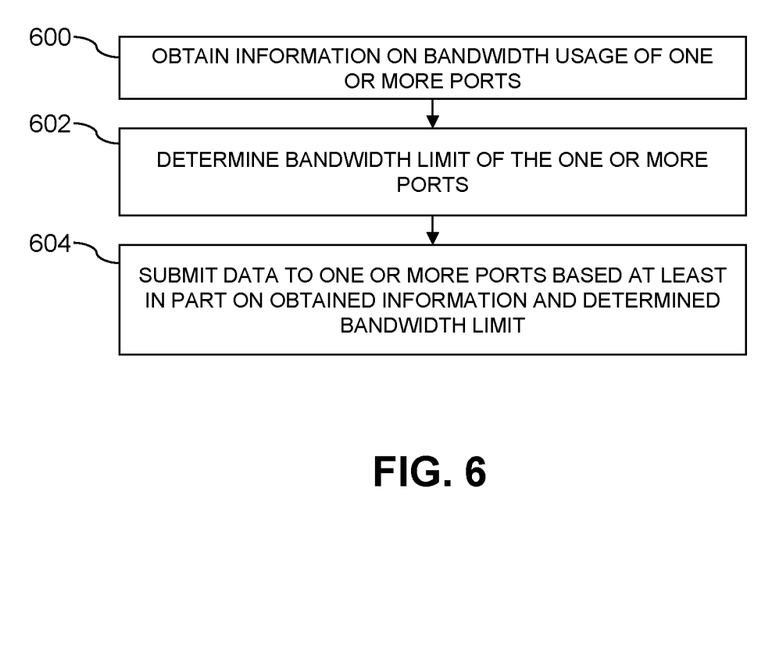
FIG. 6 is a flow diagram of an example process for port usage information sharing between host devices in an illustrative embodiment.

The process as shown in FIG. 6 includes steps 600 through 604, and is suitable for use in the system 100 but is more generally applicable to other types of systems comprising multiple host devices and a shared storage system.

While the example process of FIG. 6 is described below from the perspective of host device 102-1, any other host device may be configured to perform one or more of the steps of the process of FIG. 6.

At step 600, a first host device obtains information on a bandwidth usage by a second host device of one or more ports of the storage system. For example, the first host device may receive or otherwise obtain a message comprising the information from the messaging system 130 that was published to a topic corresponding to the one or more ports of the storage system by the second host device.

At step 602, the first host device determines a bandwidth limit of the one or more ports. For example, the first host device may determine that the bandwidth limit, e.g., the maximum available bandwidth of the ports 208, is 20 Gb/s. In some cases, the maximum available bandwidth may be only a portion of the total bandwidth capacity of the ports 208 that is allocated for use by the host devices 102.

At step 604, the first host device submits data to the one or more ports at a given bandwidth. The data may comprise, for example, IO operations. The given bandwidth is determined based at least in part on the obtained information and the determined bandwidth limit of the one or more ports 208 of the storage system. For example, where the second host device is using 10 Gb/s and the bandwidth limit is 20 Gb/s, the first host device may submit the data at a given bandwidth of up to 10 Gb/s. As another example, where the second host device is using 19 Gb/s and the bandwidth limit is 20 Gb/s, the first host device may submit the data at a given bandwidth of up to 1 Gb/s. As mentioned above, the given bandwidth may also be determined based at least in part on the QoS requirements of each of the first and second host devices and their respective QoS criticality.

Separate instances of the process of FIG. 6 may be performed in respective additional host devices that share the storage array.

The particular processing operations and other system functionality described in conjunction with the flow diagrams of FIG. 6 are presented by way of illustrative example only, and should not be construed as limiting the scope of the disclosure in any way. Alternative embodiments can use other types of processing operations involving host devices, storage systems and messaging logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different messaging logic arrangements within a given information processing system.

Functionality such as that described in conjunction with the flow diagram of FIG. 6 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for port usage information sharing between host devices are carried out at least in part under the control of its messaging logic 114. For example, messaging logic 114 is illustratively configured to control performance of portions of the process shown in the flow diagram described above in conjunction with FIG. 6.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for port usage information sharing between host devices. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support port usage information sharing between host devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for port usage information sharing between host devices as disclosed herein, congestion may occur on the ports of a storage system that impact the QoS of a given host device.

Such drawbacks are advantageously overcome in illustrative embodiments herein by utilization of messaging logic 114 to implement functionality for port usage information sharing between host devices as described above. For example, by allowing a given host device having a high QoS criticality to share port usage information, other host devices having lower QoS criticality may throttle their data submissions to the corresponding ports to ensure that the QoS having the high criticality is met and to avoid congestion on the ports. In addition, by allowing the host devices to share port usage information, the bandwidth of the ports may be maximized by the host devices without causing congestion in cases where a given host device is using less than its minimum available bandwidth as defined by its QoS.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the messaging logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, messaging logic and messaging systems. Also, the particular configurations of system and device elements and associated processing operations illustratively shown in the drawings can be varied in other embodiments. For example, a wide variety of different MPIO driver configurations and associated messaging logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a first host device configured to communicate over a network with a storage array, the first host device being configured:
   to obtain information on a bandwidth usage by a second host device of one or more ports of the storage array;
   to determine a bandwidth limit of the one or more ports of the storage array; and
   to submit data to the one or more ports at a given bandwidth, the given bandwidth being determined based at least in part on the obtained information and the determined bandwidth limit of the one or more ports of the storage array.

2. The apparatus of claim 1 wherein obtaining the information comprises receiving a message from a messaging system, the message having been published to the messaging system by the second host device.

3. The apparatus of claim 2 wherein the first host device is subscribed to a topic of the messaging system corresponding to the one or more ports and the message is published to the topic of the message system corresponding to the one or more ports.

4. The apparatus of claim 1 wherein the obtained information further comprises an indication of a quality of service bandwidth requirement of the second host device.

5. The apparatus of claim 4 wherein the first host device is further configured:
   to compare the bandwidth usage of the second host device with the indication of the quality of service bandwidth requirement of the second host device; and
   to determine the given bandwidth based at least in part on the comparison of the bandwidth usage of the second host device with the indication of the quality of service bandwidth requirement of the second host device.

6. The apparatus of claim 5 wherein:
   the first host device is further configured to determine, based at least in part on the comparison of the bandwidth usage of the second host device with the indication of the quality of service bandwidth requirement of the second host device, a difference in bandwidth between the bandwidth usage of the second host device and the quality of service bandwidth requirement of the second host device; and wherein the given bandwidth comprises at least some of the difference in bandwidth.

7. The apparatus of claim 2 wherein the first host device is further configured:

to determine a bandwidth usage by the first host device of the one or more ports of the storage array;

to determine a quality of service bandwidth requirement of the first host device; and to publish a message comprising information on the bandwidth usage by the first host device and the quality of service bandwidth requirement of the first host device to a messaging system, the messaging system configured to provide the submitted message to at least one other host device associated with the one or more ports of the storage array.

8. A method comprising:

obtaining information on a bandwidth usage by a second host device of one or more ports of a storage array;

determining a bandwidth limit of the one or more ports of the storage array; and submitting data to the one or more ports at a given bandwidth, the given bandwidth being determined based at least in part on the obtained information and the determined bandwidth limit of the one or more ports of the storage array;

wherein the method is implemented by a first host device that is configured to communicate over a network with a storage array, the host device comprising a processor coupled to a memory.

9. The method of claim 8 wherein obtaining the information comprises receiving a message from a messaging system, the message having been published to the messaging system by the second host device.

10. The method of claim 9 wherein the first host device is subscribed to a topic of the messaging system corresponding to the one or more ports and the message is published to the topic of the message system corresponding to the one or more ports.

11. The method of claim 8 wherein the obtained information further comprises an indication of a quality of service bandwidth requirement of the second host device.

12. The method of claim 11 wherein the method further comprises:

comparing the bandwidth usage of the second host device with the indication of the quality of service bandwidth requirement of the second host device; and determining the given bandwidth based at least in part on the comparison of the bandwidth usage of the second host device with the indication of the quality of service bandwidth requirement of the second host device.

13. The method of claim 12:

wherein the method further comprises determining, based at least in part on the comparison of the bandwidth usage of the second host device with the indication of the quality of service bandwidth requirement of the second host device, a difference in bandwidth between the bandwidth usage of the second host device and the quality of service bandwidth requirement of the second host device; and wherein the given bandwidth comprises at least some of the difference in bandwidth.

14. The method of claim 9 wherein the method further comprises:

determining a bandwidth usage by the first host device of the one or more ports of the storage array;

determining a quality of service bandwidth requirement of the first host device; and publishing a message comprising information on the bandwidth usage by the first host device and the quality of service bandwidth requirement of the first host device to a messaging system, the messaging system configured to provide the submitted message to at least one other host device associated with the one or more ports of the storage array.

15. A computer program product comprising a non-transitory processor-readable storage medium having stored therein program code of one or more software programs, wherein the program code, when executed by a first host device that is configured to communicate over a network with a storage array, causes the first host device:

to obtain information on a bandwidth usage by a second host device of one or more ports of the storage array;

to determine a bandwidth limit of the one or more ports of the storage array; and to submit data to the one or more ports at a given bandwidth, the given bandwidth being determined based at least in part on the obtained information and the determined bandwidth limit of the one or more ports of the storage array.

16. The computer program product of claim 15 wherein obtaining the information comprises receiving a message from a messaging system, the message having been published to the messaging system by the second host device.

17. The computer program product of claim 16 wherein the first host device is subscribed to a topic of the messaging system corresponding to the one or more ports and the message is published to the topic of the message system corresponding to the one or more ports.

18. The computer program product of claim 15 wherein the obtained information further comprises an indication of a quality of service bandwidth requirement of the second host device.

19. The computer program product of claim 18 wherein the program code further causes the first host device:

to compare the bandwidth usage of the second host device with the indication of the quality of service bandwidth requirement of the second host device; and to determine the given bandwidth based at least in part on the comparison of the bandwidth usage of the second host device with the indication of the quality of service bandwidth requirement of the second host device.

20. The computer program product of claim 16 wherein the program code further causes the first host device:

to determine a bandwidth usage by the first host device of the one or more ports of the storage array;

to determine a quality of service bandwidth requirement of the first host device; and to publish a message comprising information on the bandwidth usage by the first host device and the quality of service bandwidth requirement of the first host device to a messaging system, the messaging system configured to provide the submitted message to at least one other host device associated with the one or more ports of the storage array.

* * * * *